United States Patent
Chiba et al.

(10) Patent No.: US 12,461,513 B2
(45) Date of Patent: Nov. 4, 2025

(54) VISUALIZATION SYSTEM

(71) Applicants: KABUSHIKI KAISHA TOSHIBA, Tokyo (JP); Toshiba Digital Solutions Corporation, Kawasaki (JP)

(72) Inventors: Katsuhisa Chiba, Koganei Tokyo (JP); Masanori Tajima, Kawasaki Kanagawa (JP); Shinya Watanabe, Kawasaki Kanagawa (JP)

(73) Assignees: Kabushiki Kaisha Toshiba, Kawasaki (JP); Toshiba Digital Solutions Corporation, Kawasaki (JP)

( * ) Notice: Subject to any disclaimer, the term of this patent is extended or adjusted under 35 U.S.C. 154(b) by 621 days.

(21) Appl. No.: 17/907,181

(22) PCT Filed: Oct. 22, 2020

(86) PCT No.: PCT/JP2020/039660
§ 371 (c)(1),
(2) Date: Sep. 23, 2022

(87) PCT Pub. No.: WO2021/199470
PCT Pub. Date: Oct. 7, 2021

(65) Prior Publication Data
US 2024/0210927 A1    Jun. 27, 2024

(30) Foreign Application Priority Data
Mar. 31, 2020    (JP) .................................. 2020-063626

(51) Int. Cl.
*G05B 19/41*    (2006.01)
*G05B 19/418*    (2006.01)
(Continued)

(52) U.S. Cl.
CPC ................. *G05B 19/41875* (2013.01); *G05B 2219/31472* (2013.01); *G05B 2219/31477* (2013.01); *G06Q 10/06* (2013.01); *G06Q 50/04* (2013.01)

(58) Field of Classification Search
None
See application file for complete search history.

(56) References Cited

U.S. PATENT DOCUMENTS

| | | | | |
|---|---|---|---|---|
| 5,088,045 A | * | 2/1992 | Shimanaka | G05B 19/41835 700/169 |
| 7,411,500 B2 | * | 8/2008 | Hamerly | G06Q 50/04 340/572.1 |

(Continued)

FOREIGN PATENT DOCUMENTS

| | | |
|---|---|---|
| CN | 108369411 A | 8/2018 |
| CN | 110770663 A | 2/2020 |

(Continued)

OTHER PUBLICATIONS

Carlson et al., "Simulating an agile, synchronized manufacturing system", Jan. 2006, Int. J. Production Economics 112 (2008) 714-722. (Year: 2006).*

(Continued)

*Primary Examiner* — Mohammad Ali
*Assistant Examiner* — Kelvin Booker
(74) *Attorney, Agent, or Firm* — Finnegan, Henderson, Farabow. Garrett & Dunner, LLP

(57) ABSTRACT

To visually display the manufacturing statuses of products manufactured through a plurality of manufacturing processes in order and changes of process characteristic factors caused in the manufacturing processes, a visualization system according to an embodiment stores manufacturing log information including start times and end times of manufacturing processes of products grouped in manufacturing (Continued)

units and manufactured through a plurality of manufacturing processes in order, and chronological history information of process characteristic factors corresponding to factors affecting quality characteristics in the manufacturing processes. A time axis for the process characteristic factors in synchronization with the time course of the manufacturing log information is created, and a display object representing a state or a change of each of the process characteristic factors is created based on the chronological history information and placed on the time axis to create a timeline object of each of the process characteristic factors. A process characteristic factor timeline screen including the timeline objects of the respective process characteristic factors arranged in parallel is displayed on a display apparatus.

20 Claims, 9 Drawing Sheets

(51) Int. Cl.
*G06Q 10/06* (2023.01)
*G06Q 50/04* (2012.01)

(56) References Cited

U.S. PATENT DOCUMENTS

| | | | | |
|---|---|---|---|---|
| 8,150,541 | B2* | 4/2012 | Moore, Jr. | G05B 19/41865 |
| | | | | 700/103 |
| 9,395,959 | B2* | 7/2016 | Hatfield | G06Q 10/06 |
| 10,120,368 | B2* | 11/2018 | Nishioka | G05B 19/406 |
| 10,395,400 | B2* | 8/2019 | Nomamoto | G05B 19/409 |
| 11,392,110 | B2* | 7/2022 | Chiba | G05B 19/406 |
| 2005/0015169 | A1* | 1/2005 | Littlejohn | G05B 19/4097 |
| | | | | 700/108 |
| 2009/0024239 | A1 | 1/2009 | Yoshioka et al. | |
| 2010/0217418 | A1* | 8/2010 | Fontanot | G06Q 10/06 |
| | | | | 700/100 |
| 2013/0152041 | A1* | 6/2013 | Hatfield | G06Q 10/06 |
| | | | | 717/105 |
| 2013/0346138 | A1* | 12/2013 | Rai | G06Q 10/06 |
| | | | | 705/7.24 |
| 2014/0297374 | A1* | 10/2014 | Ikezawa | G06Q 10/06395 |
| | | | | 705/7.41 |
| 2015/0097840 | A1* | 4/2015 | Nishimura | G06Q 10/0639 |
| | | | | 345/443 |
| 2015/0153730 | A1 | 6/2015 | Nishimura et al. | |
| 2016/0005298 | A1 | 1/2016 | Takahashi et al. | |
| 2016/0284109 | A1 | 9/2016 | Nishimura et al. | |
| 2017/0315540 | A1* | 11/2017 | Nishioka | G05B 19/406 |
| 2018/0253874 | A1* | 9/2018 | Nomamoto | G06Q 50/04 |
| 2018/0268580 | A1 | 9/2018 | Nomamoto et al. | |
| 2019/0012622 | A1* | 1/2019 | Nishimura | G05B 19/418 |
| 2019/0129906 | A1 | 5/2019 | Keen | |
| 2019/0258230 | A1* | 8/2019 | Chiba | G05B 19/418 |
| 2020/0184692 | A1 | 6/2020 | Yang et al. | |

FOREIGN PATENT DOCUMENTS

| | | |
|---|---|---|
| JP | 2002-117047 A | 4/2002 |
| JP | 2004-198148 A | 7/2004 |
| JP | 2005-215845 A | 8/2005 |
| JP | 2008-299762 A | 12/2008 |
| JP | 2009-25851 A | 2/2009 |
| JP | 2010-40007 A | 2/2010 |
| JP | 2011-76131 A | 4/2011 |
| JP | 2014-179060 A | 9/2014 |
| WO | WO 2018/079185 A1 | 5/2018 |
| WO | WO 2019/003524 A1 | 1/2019 |

OTHER PUBLICATIONS

Kujawinska et al., "Human Factors in Visual Quality Control", Apr. 2015, Management and Production Engineering Review, vol. 6, No. 2, Jun. 2015, pp. 25-31. (Year: 2015).*

Gan et al., "Using Manufacturing Process Flow for Time Synchronization in HLA-Based Simulation", 2005, Ninth IEEE International Symposium on Distributed Simulation and Real-Time Applications. (Year: 2005).*

Xu et al., "ViDX: Visual Diagnostics of Assembly Line Performance in Smart Factories", Mar. 2016, IEEE Transactions On Visualization and Computer Graphics vol. 23, No. 1, Jan. 2017. (Year: 2016).*

Qu et al., "IoT-based real-time production logistics synchronization system under smart cloud manufacturing", Mar. 2015, Int J Adv Manuf Technol (2016) 84:147-164. (Year: 2015).*

James M. Wilson, "Gantt charts: A centenary appreciation," European Journal of Operational Science, vol. 149, pp. 430-437 (2003).

State Intellectual Property Office of People's Republic of China, Office Action in CN App. No. 202080098604.8, 13 pages, and machine translation, 15 pages (Feb. 19, 2025).

PRC Nat'l IP Admin., Notice of Completing Formalities for Patent Registration in CN App. No. 202080098604.8 (Aug. 27, 2025).

* cited by examiner

[FIG. 1]
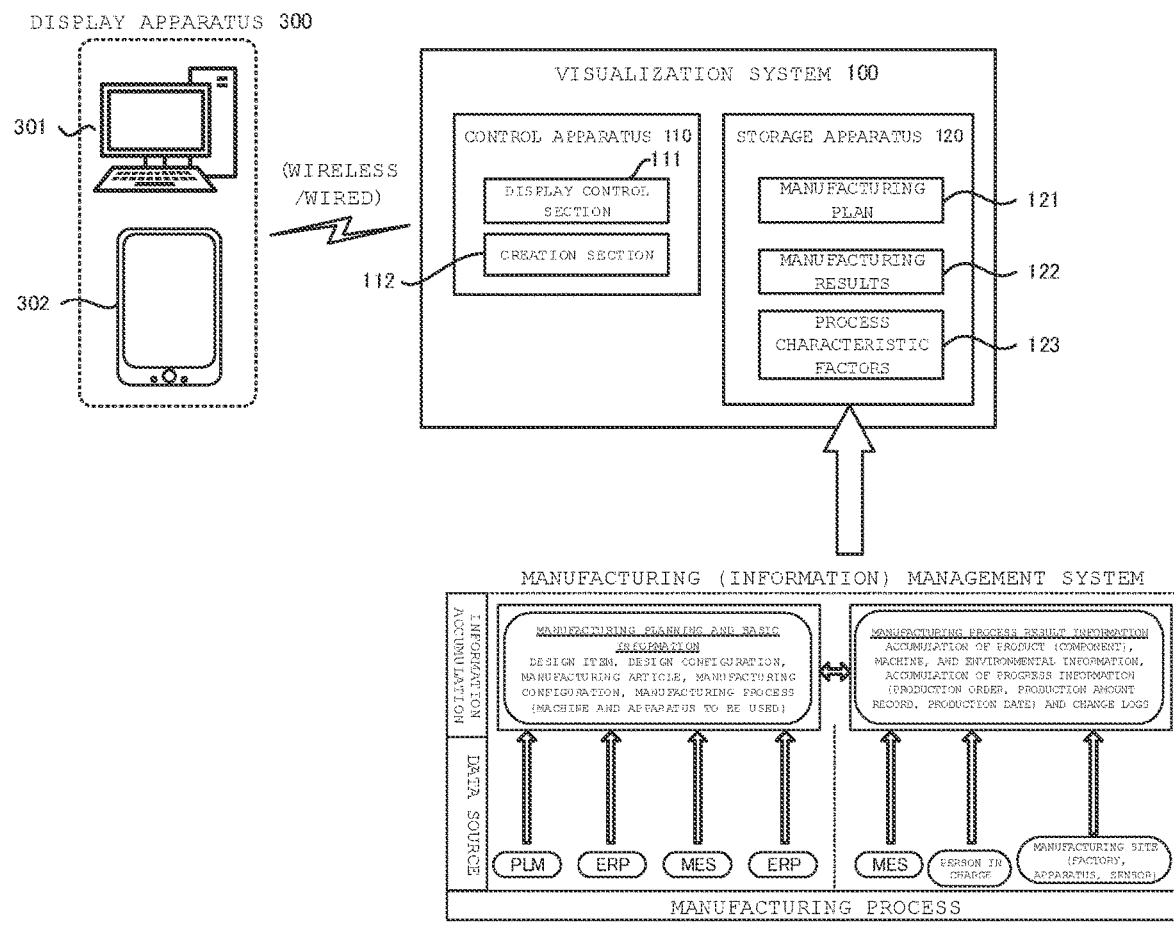

[FIG. 2]

(MANUFACTURING RESULTS)

| LOT ID | PROCESS ID | PROCESS 1 | PROCESS 2 | PROCESS 3 | PROCESS 4 | PROCESS 5 | PROCESS 6 | PROCESS 7 | PROCESS 8 |
|---|---|---|---|---|---|---|---|---|---|
| R001 | START TIME | 2017/6/2 10:50:00 | 2017/6/2 11:06:00 | 2017/6/2 11:12:00 | · · · · | · · · · | · · · · | · · · · | · · · · |
| | END TIME | 2017/6/2 11:05:00 | 2017/6/2 11:11:00 | 2017/6/2 11:20:00 | · · · · | · · · · | · · · · | · · · · | · · · · |
| | PROCESSING PERIOD | 0:15:00 | 0:05:00 | 0:08:00 | · · · · | · · · · | · · · · | · · · · | · · · · |
| R002 | START TIME | 2017/6/2 11:05:05 | 2017/6/2 11:21:05 | 201/6/2 11:27:05 | · · · · | · · · · | · · · · | · · · · | · · · · |
| | END TIME | 2017/6/2 11:20:05 | 2017/6/2 11:26:05 | 2017/6/2 11:35:05 | · · · · | · · · · | · · · · | · · · · | · · · · |
| | PROCESSING PERIOD | 0:15:00 | 0:05:00 | 0:08:00 | · · · · | · · · · | · · · · | · · · · | · · · · |
| R003 | START TIME | 2017/6/2 11:20:10 | 2017/6/2 11:36:10 | 2017/6/2 11:42:10 | · · · · | · · · · | · · · · | · · · · | · · · · |
| | END TIME | 2017/6/2 11:35:10 | 2017/6/2 11:41:10 | 2017/6/2 11:50:10 | · · · · | · · · · | · · · · | · · · · | · · · · |
| | PROCESSING PERIOD | 0:15:00 | 0:05:00 | 0:08:00 | · · · · | · · · · | · · · · | · · · · | · · · · |
| · · · · | · · · · | · · · · | · · · · | · · · · | · · · · | · · · · | · · · · | · · · · | · · · · |
| R010 | START TIME | · · · · | 2017/6/2 12:58:30 | · · · · | · · · · | · · · · | · · · · | · · · · | · · · · |
| | END TIME | · · · · | 2017/6/2 13:01:30 | · · · · | · · · · | · · · · | · · · · | · · · · | · · · · |
| | PROCESSING PERIOD | · · · · | 0:02:00 | · · · · | · · · · | · · · · | · · · · | · · · · | · · · · |
| R011 | START TIME | · · · · | 2017/6/2 12:59:00 | · · · · | · · · · | · · · · | · · · · | · · · · | · · · · |
| | END TIME | · · · · | 2017/6/2 13:02:00 | · · · · | · · · · | · · · · | · · · · | · · · · | · · · · |
| | PROCESSING PERIOD | · · · · | 0:02:00 | · · · · | · · · · | · · · · | · · · · | · · · · | · · · · |
| R012 | START TIME | · · · · | 2017/6/2 12:59:30 | · · · · | · · · · | · · · · | · · · · | · · · · | · · · · |
| | END TIME | · · · · | 2017/6/2 13:02:30 | · · · · | · · · · | · · · · | · · · · | · · · · | · · · · |
| | PROCESSING PERIOD | · · · · | 0:02:00 | · · · · | · · · · | · · · · | · · · · | · · · · | · · · · |

[FIG. 3]

(MANUFACTURING AND OPERATION RESULT DATA)

| [SUBJECT] (Who) Who | [OBJECT] (whome) whome | [EVENT] (what) what | [TIME] (when) when | [PLACE] (Where) Where | [CAUSE] (Why) Why | [STATUS] (How) How |
|---|---|---|---|---|---|---|
| MACHINE 1 (MACHINE SERIAL ID : 11111) | COMPONENT NUMBER(D-001) SERIAL ID(31235) / COMPONENT NUMBER(E-001) SERIAL ID(41234) / COMPONENT NUMBER(F-001) SERIAL ID(41235) | SUBSTRATE ASSEMBLY | 2016/9/2 10:30 | THIRD STATION OF SUBSTRATE ASSEMBLY FIRST LINE OF SUBSTRATE ASSEMBLY PROCESS | – | – |
| INSPECTION MACHINE1 (MACHINE SERIAL ID : 22222) | COMPONENT NUMBER(D-001) SERIAL ID(31235) | SUBSTRATE ASSEMBLY INSPECTION | 2016/9/2 11:00 | INSPECTION STATION OF SUBSTRATE ASSEMBLY FIRST LINE OF SUBSTRATE ASSEMBLY PROCESS | – | – |
| ..... | ..... | ..... | ..... | ..... | ..... | ..... |
| MACHINE 2 (MACHINE SERIAL ID : 99999) | MANUFACTURING NUMBER(A-001) SERIAL ID(12345) / COMPONENT NUMBER(B-001) SERIAL ID(21234) / COMPONENT NUMBER(I-001) SERIAL ID(21235) | PC ASSEMBLY | 2016/9/2 12:30 | FIRST STATION OF PC ASSEMBLY FIRST LINE OF PC ASSEMBLY PROCESS | – | – |
| ..... | ..... | ..... | ..... | ..... | ..... | ..... |

(TIME-SERIES)

(MANUFACTURING RECIPE RESULT DATA)    (SENSOR INFORMATION)

| [SUBJECT] (Who) Who | [OBJECT] (whome) whome | [EVENT] (what) what | [TIME] (when) when | [PLACE] (Where) Where | [CAUSE] (Why) Why | [STATUS] (How) How |
|---|---|---|---|---|---|---|
| MACHINE 1 (MACHINE SERIAL ID : 11111) | COMPONENT NUMBER(D-001) SERIAL ID(31235) / COMPONENT NUMBER(E-001) SERIAL ID(41234) | CPU MOUNTING | 2016/9/2 10:30 | THIRD STATION OF SUBSTRATE ASSEMBLY FIRST LINE OF SUBSTRATE ASSEMBLY PROCESS | – | SOLDERING AT FLOW RATE OF ΔΔ |
| MACHINE 1 (MACHINE SERIAL ID : 11111) | COMPONENT NUMBER(D-001) SERIAL ID(31235) / COMPONENT NUMBER(F-001) SERIAL ID(41235) | MEMORY MOUNTING | 2016/9/2 10:31 | THIRD STATION OF SUBSTRATE ASSEMBLY FIRST LINE OF SUBSTRATE ASSEMBLY PROCESS | – | REFLOW AT TEMPERATURE OF ◯◯ |
| ..... | ..... | ..... | ..... | ..... | ..... | ..... |

(TIME-SERIES)

(MANUFACTURING QUALITY INSPECTION DATA)    (SENSOR INFORMATION)

| [SUBJECT] (Who) Who | [OBJECT] (whome) whome | [EVENT] (what) what | [TIME] (when) when | [PLACE] (Where) Where | [CAUSE] (Why) Why | [STATUS] (How) How |
|---|---|---|---|---|---|---|
| INSPECTION MACHINE 1 (MACHINE SERIAL ID : 22222) | COMPONENT NUMBER(D-001) SERIAL ID(31235) / COMPONENT NUMBER(E-001) SERIAL ID(41234) | CPU MOUNTING INSPECTION | 2016/9/2 11:00 | INSPECTION STATION OF SUBSTRATE ASSEMBLY FIRST LINE OF SUBSTRATE ASSEMBLY PROCESS | – | MOUNTING CHECK: OK (CONDUCTION CHECKED) |
| INSPECTION MACHINE 1 (MACHINE SERIAL ID : 22222) | COMPONENT NUMBER(D-001) SERIAL ID(31235) / COMPONENT NUMBER(F-001) SERIAL ID(41235) | MEMORY MOUNTING INSPECTION | 2016/9/2 11:01 | INSPECTION STATION OF SUBSTRATE ASSEMBLY FIRST LINE OF SUBSTRATE ASSEMBLY PROCESS | – | MOUNTING INSPECTION: OK (CONDUCTION AND VIBRATION CHECKED) |
| ..... | ..... | ..... | ..... | ..... | ..... | ..... |

(TIME-SERIES)

(ACCEPTANCE INSPECTION RESULT DATA)

| [SUBJECT] (Who) Who | [OBJECT] (whome) whome | [EVENT] (what) what | [TIME] (when) when | [PLACE] (Where) Where | [CAUSE] (Why) Why | [STATUS] (How) How |
|---|---|---|---|---|---|---|
| ACCEPTANCE INSPECTION PERSON A (PERSON SERIAL ID : 5555) | COMPONENT NUMBER(D-001) SERIAL ID(31235~) MOTHERBOARD | PROCURED | 2016/8/25 10:00 | COMPANY A MANUFACTURED IN FACTORY B | – | – |
| ACCEPTANCE INSPECTION PERSON A (PERSON SERIAL ID : 5555) | COMPONENT NUMBER(F-001) SERIAL ID(41235~) MEMORY | PROCURED | 2016/8/26 15:00 | COMPANY X MANUFACTURED IN FACTORY Y | – | – |
| ..... | ..... | ..... | ..... | ..... | ..... | ..... |

(TIME-SERIES)

[FIG. 4]

(MACHINE ALERT HISTORY)

| [SUBJECT] | [OBJECT] | [EVENT] | [TIME] | [PLACE] | [CAUSE] | [STATUS] |
|---|---|---|---|---|---|---|
| (Who) Who | (whome) whome | (what) what | (when) when | (Where) Where | (Why) Why | (How) How |
| MACHINE 1 (MACHINE SERIAL ID : 11111) | — | — | 2016/9/2 10:45 | — | ABNORMAL OO | STOP |

(MACHINE MAINTENANCE HISTORY)

| [SUBJECT] | [OBJECT] | [EVENT] | [TIME] | [PLACE] | [CAUSE] | [STATUS] |
|---|---|---|---|---|---|---|
| (Who) Who | (whome) whome | (what) what | (when) when | (Where) Where | (Why) Why | (How) How |
| A | MACHINE 1 (MACHINE SERIAL ID : 11111) | PART REPLACEMENT | 2016/1/20 0:00 | — | PERIODIC MAINTENANCE | SENSOR006 (SENSOR SERIAL ID : X0006) →SENSOR001 (SENSOR SERIAL ID : X0001) |

[FIG. 5]

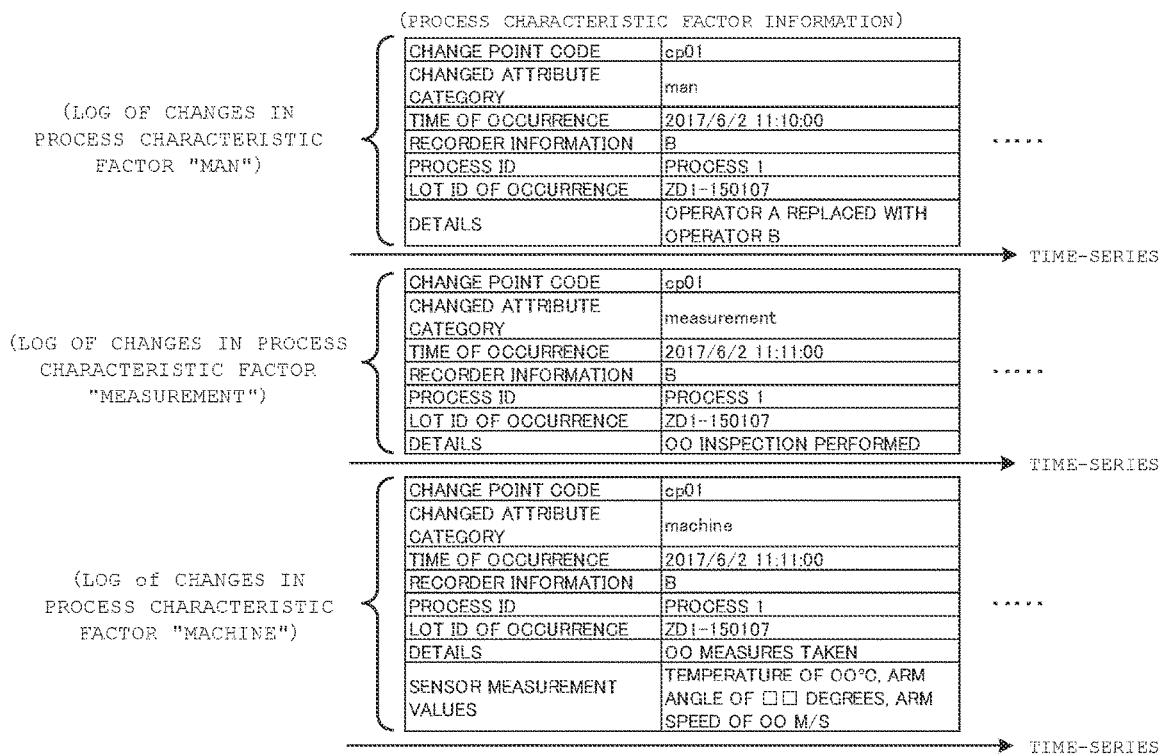

[FIG. 6]
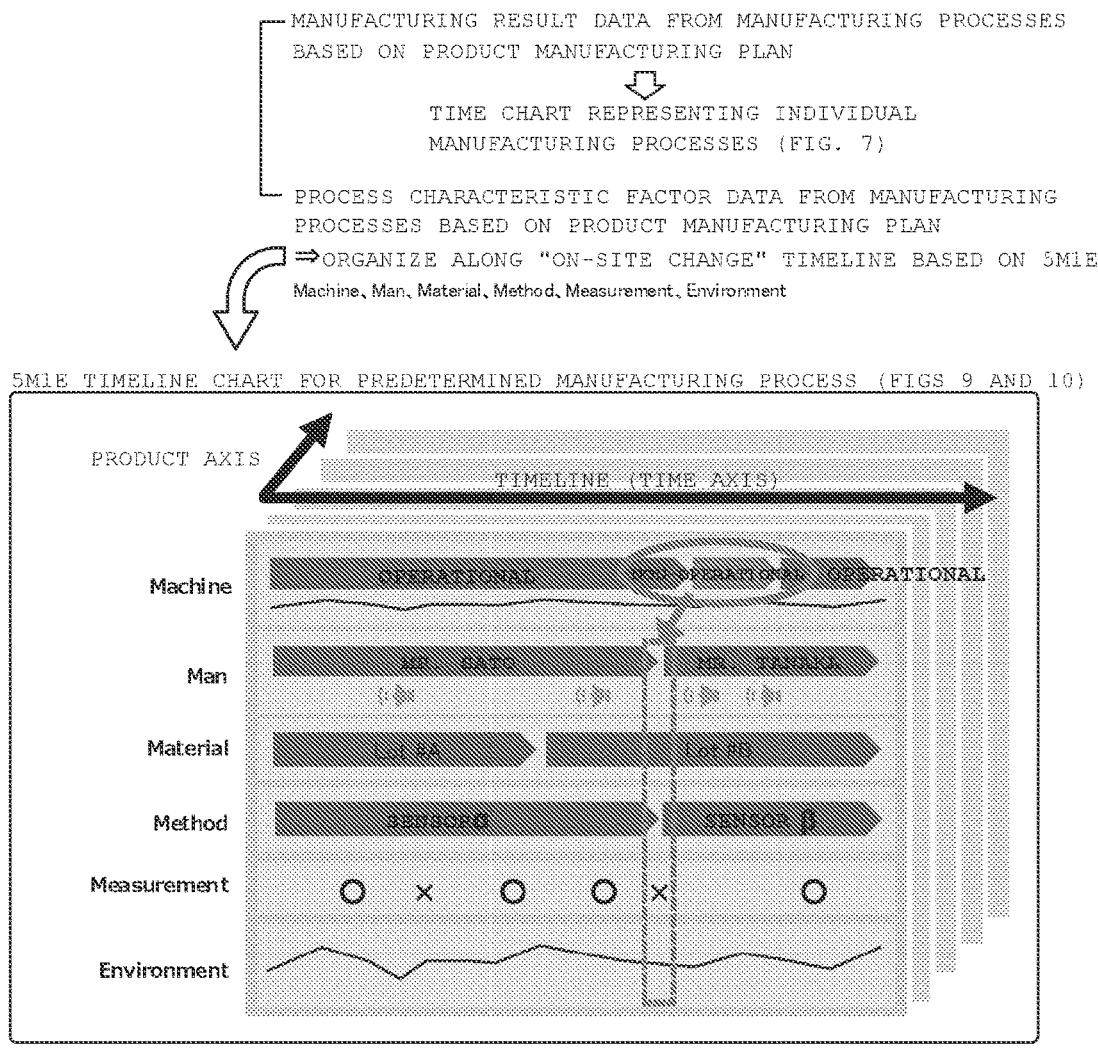

[FIG. 7]
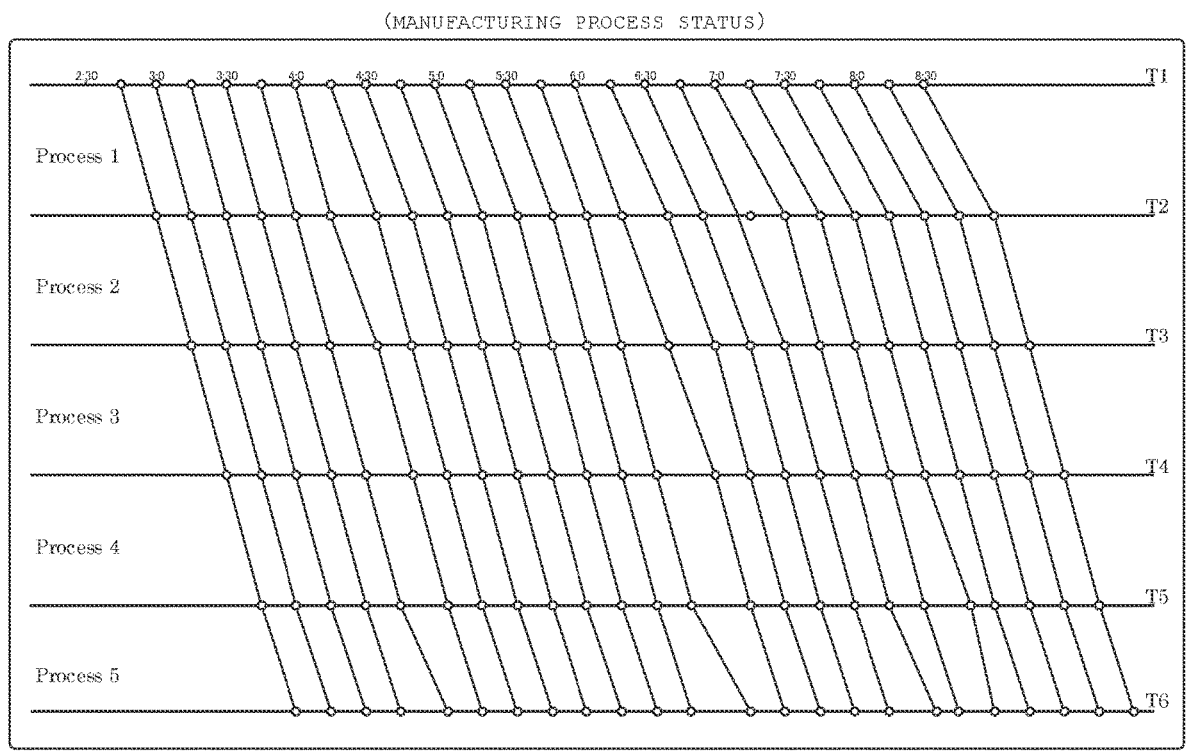
[FIG. 8]
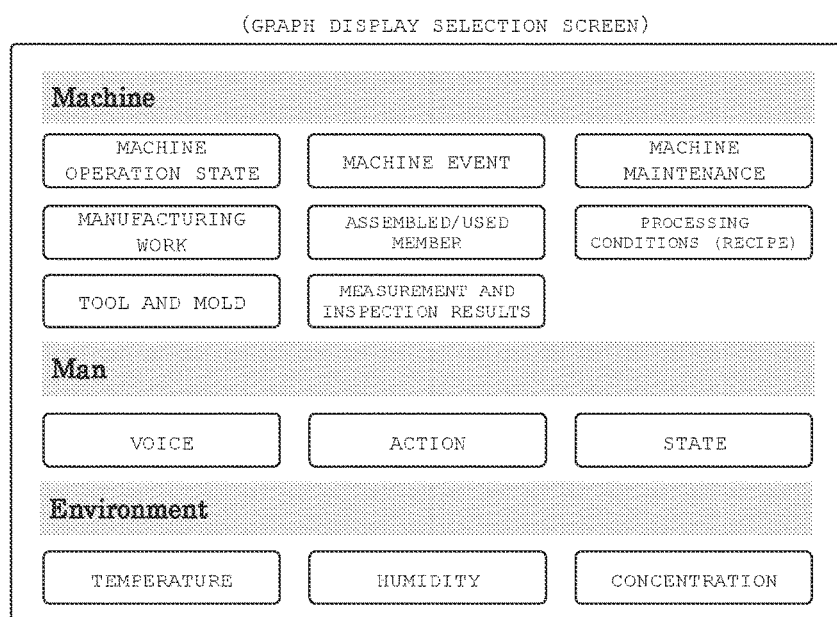

[FIG. 9]
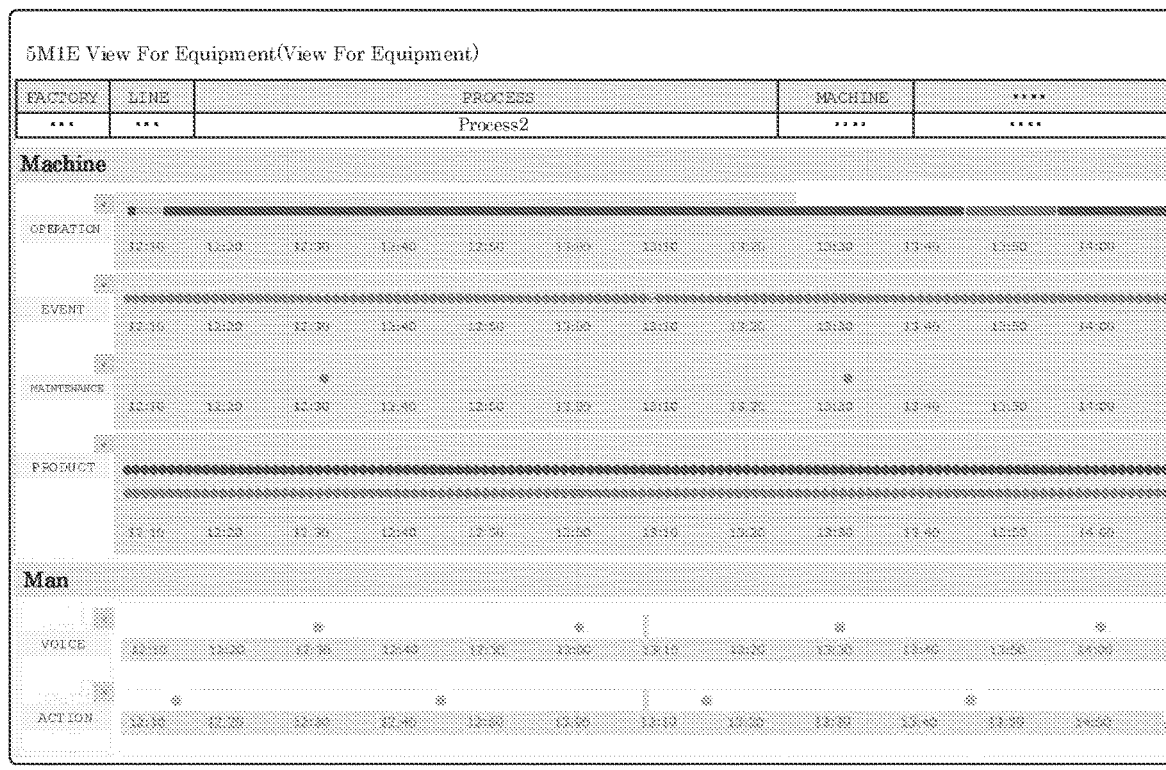
[FIG. 10]
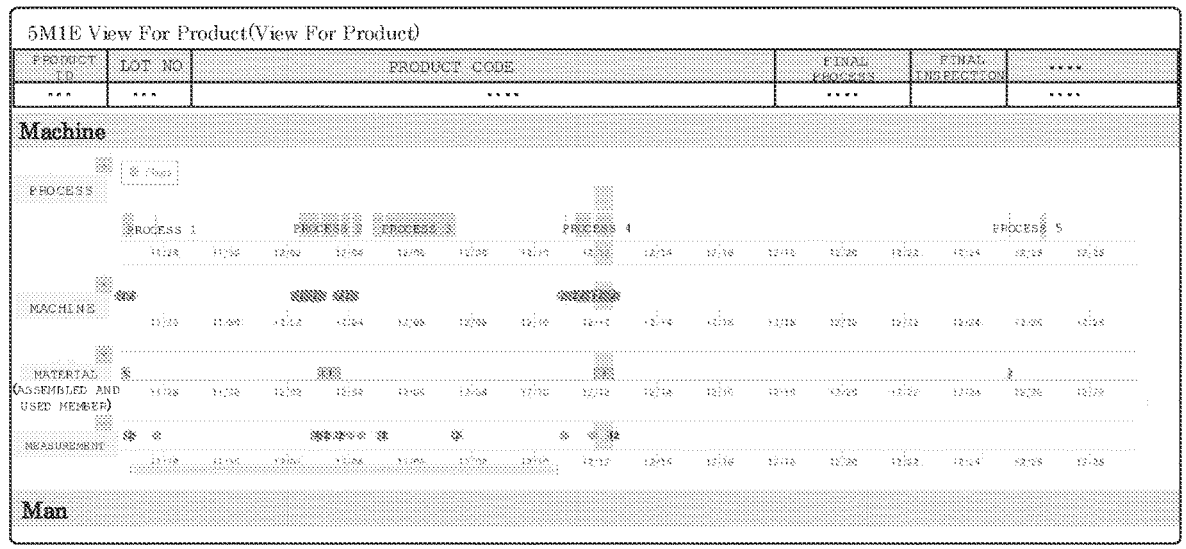

[FIG. 11]
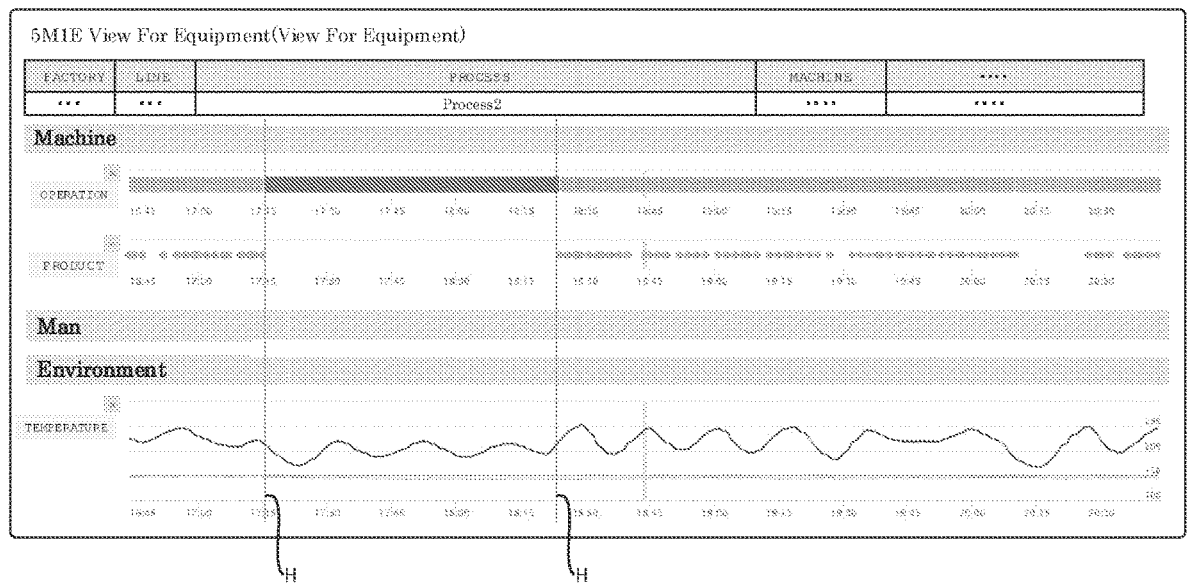

[FIG. 12]
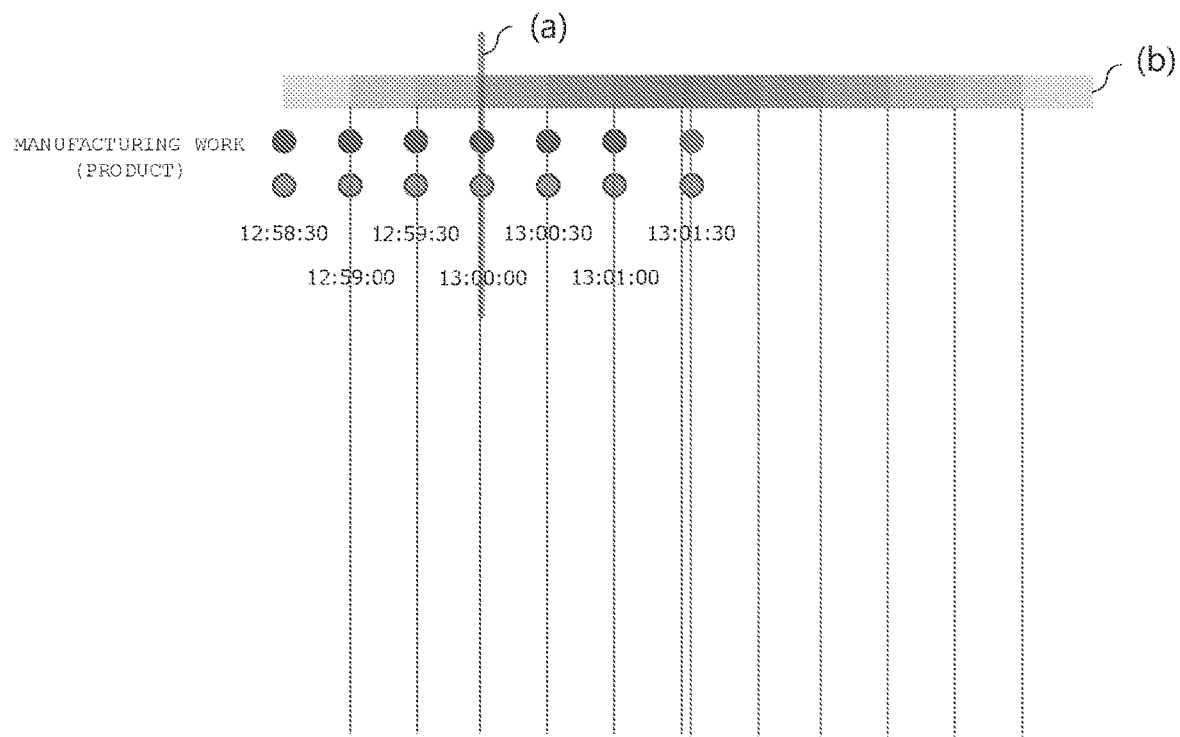
[FIG. 12A]
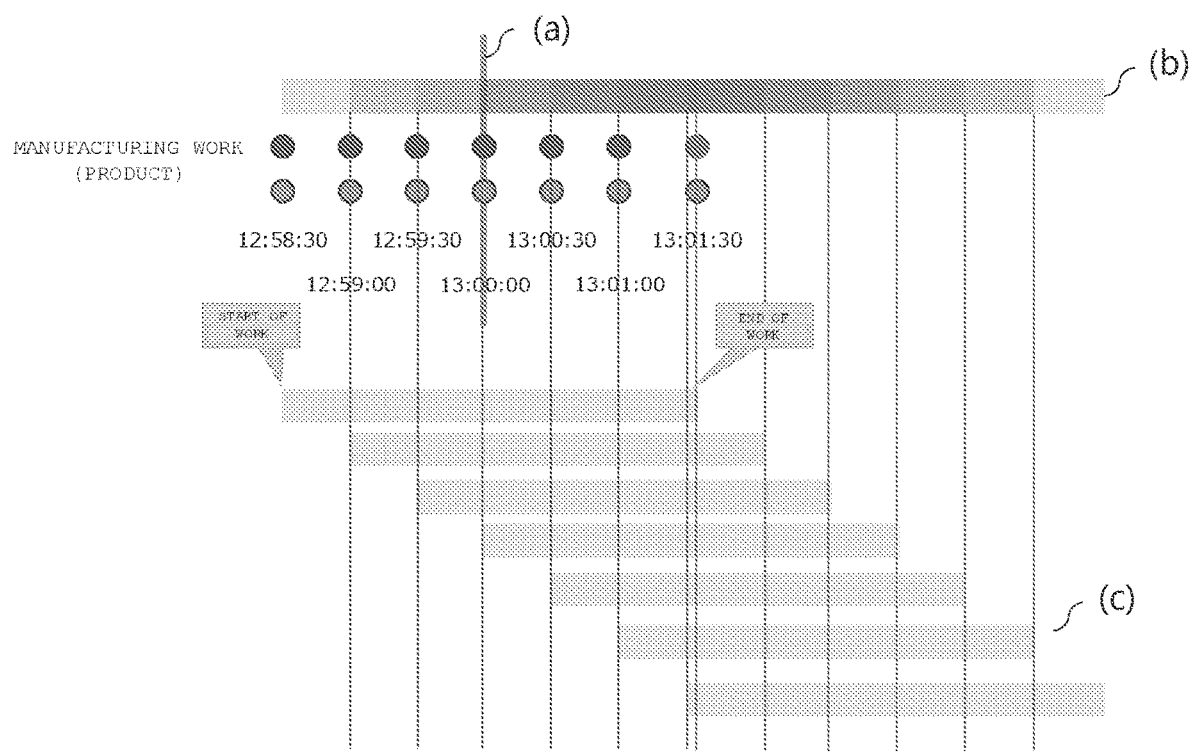

VISUALIZATION SYSTEM

CROSS-REFERENCE TO RELATED APPLICATION

This is a National Phase entry of International Application No. PCT/JP2020/039660, filed Oct. 22, 2020, which claims the benefit of Japanese Application No. 2020-063626, filed Mar. 31, 2020, the contents of each of which are incorporated herein by reference in their entireties.

TECHNICAL FIELD

The present invention relates to a technique for visualizing process characteristic factors in manufacturing processes.

BACKGROUND ART

A Gantt chart is a conventionally used technique for visualizing the manufacturing statuses of products manufactured through a plurality of manufacturing processes in order. The Gantt chart includes a plurality of manufacturing processes arranged in time sequence along a vertical axis and time axes of the respective manufacturing processes extending in parallel along a horizontal axis. The products go through the manufacturing processes in manufacturing units (lots). The start time and the end time of each manufacturing process are plotted on the time axis of the manufacturing process, and those start times or end times plotted on the time axes arranged in parallel are connected to each other by line segments, thereby allowing visualization of the manufacturing statuses in the manufacturing units.

PRIOR ART DOCUMENTS

Patent Documents

[Patent Document 1] Japanese Patent Laid-Open No. 2009-025851
[Patent Document 2] Japanese Patent Laid-Open No. 2010-040007

DISCLOSURE OF THE INVENTION

Problems to be Solved by the Invention

It is an object of the present invention to provide a visualization system capable of visibly displaying changes in process characteristic factors caused during one or more of manufacturing processes of products manufactured through the manufacturing processes such that those changes and the manufacturing statuses of the products are shown on the same timeline.

Means for Solving the Problems

According to an embodiment, a visualization system include a first storage section configured to store manufacturing log information about manufacturing of products grouped in manufacturing units, products of each unit being manufactured through a plurality of manufacturing processes in order, the manufacturing log information including a start time and an end time of each of the manufacturing processes; a second storage section configured to store chronological history information of process characteristic factors corresponding to factors affecting quality characteristics in the manufacturing processes; a first creation section configured to create a time axis for the process characteristic factors in synchronization with a time course of the manufacturing log information, create a display object representing a state or a change of each of the process characteristic factors based on the chronological history information, and place the display object on the time axis to create a timeline object of each of the process characteristic factors; and a display control section configured to display, on a display apparatus, a process characteristic factor timeline screen including the timeline objects of the respective process characteristic factors arranged in parallel.

BRIEF DESCRIPTION OF THE DRAWINGS

FIG. 1 A block diagram showing the configuration of a visualization system according to Embodiment 1.
FIG. 2 A table showing a data example of manufacturing results according to Embodiment 1.
FIG. 3 Tables showing data examples of the manufacturing results according to Embodiment 1, specifically, exemplary records of the results organized based on a data structure definition and accumulated in a data model.
FIG. 4 Tables showing examples of machine management result data according to Embodiment 1.
FIG. 5 Tables showing a data example of process characteristic factors according to Embodiment 1.
FIG. 6 An explanatory diagram for a visualization function according to Embodiment 1.
FIG. 7 A diagram showing an example of a time chart representing individual manufacturing processes as exemplary visualization of manufacturing statuses according to Embodiment 1.
FIG. 8 A diagram showing an example of a graph display selection screen according to Embodiment 1.
FIG. 9 An example of a 5M1E timeline chart created from machine (process) viewpoint according to Embodiment 1.
FIG. 10 An example of a 5M1E timeline chart created from product viewpoint according to Embodiment 1.
FIG. 11 A diagram showing an example of highlighting according to Embodiment 1.
FIG. 12 A diagram showing exemplary display of manufacturing statuses according to Embodiment 1.
FIG. 12A A diagram showing details of the exemplary display of the manufacturing statuses according to Embodiment 1.

MODE FOR CARRYING OUT THE INVENTION

An embodiment of the present invention will be described with reference to the accompanying drawings. While a plurality of manufacturing processes are described as an example in the following description, the concept of "manufacturing" as used herein also includes a mechanism for providing the result from a plurality of processes such as a waste disposal line for changing waste into recyclable waste through a plurality of processes, a garbage disposal line for disposing garbage by burning the garbage in an incinerator, and a printing line for printing newspapers or other materials, all of which are encompassed within the scope of the present invention. In other words, "products" and "manufacturing" referred to in the present invention are not limited to production of articles.

Embodiment 1

FIG. 1 is a block diagram showing the configuration of a visualization system 100 according to Embodiment 1 of the present invention. The visualization system 100 includes a control apparatus 110 and a storage apparatus 120, and is connected to a display apparatus 300 over wireless connection or wired connection. The display apparatus 300 is a display terminal including a display such as a computer 301, a tablet computer 302, a multi-functional cellular phone, or a Personal Digital Assistant (PDA), and can have a data communication function and a computing function (provided by a CPU, for example) as required.

While Embodiment 1 shows an example in which the standalone display apparatus 300 is connected to the visualization system 100, the present invention is not limited thereto. For example, the visualization system 100 can be connected to a display to configure the visualization system 100 according to Embodiment 1 as a display apparatus including the functions of the visualization system 100. In other words, the visualization system according to Embodiment 1 can be configured as a single display apparatus.

The visualization system 100 according to Embodiment 1 provides a visualization function of visualizing the manufacturing statuses of products manufactured through a plurality of manufacturing processes in order and displaying the manufacturing statuses on the display apparatus 300. The storage apparatus 120 stores histories including a manufacturing plan 121, manufacturing results 122, and process characteristic factors 123, for each of the plurality of manufacturing processes.

The various types of information stored in the storage apparatus 120 are supplied from a predetermined manufacturing management system as shown in FIG. 1. The manufacturing management system mainly collects and accumulates, from data sources, various types of information ranging from manufacturing planning and basic information to information resulting from manufacturing processes.

Examples of the manufacturing plan 121 include production planning, information about apparatuses/equipment to be used, planned values of production amount, and planned time schedule values of a manufacturing line (including planned time schedule values of processes constituting the manufacturing line).

Examples of the manufacturing results 122 include information about products manufactured in manufacturing units (such as the start time, end time, and processing period of each of processes constituting the manufacturing line), statuses of machines in operation, environmental information, inspection results, production amount records, and actual result values including change histories based on quality control (logs of process characteristic factor changes), later described. The manufacturing results 122 can be configured to store time-series information collected from data sources such as machine equipment or sensor equipment used in the manufacturing processes constituting the product manufacturing line such that sensor values acquired from the sensor equipment are included.

FIG. 2 shows a table illustrating a data example of the manufacturing results 122. The example of FIG. 2 shows an aspect in which a set of products of the same type corresponding to a production unit (a product manufacturing unit, or a lot) goes through a plurality of processes. In the manufacturing results 122, a plurality of manufacturing processes constituting a manufacturing line are associated with lot IDs of products going through the manufacturing line, and each of the lot IDs is associated with the start time, the end time, and the processing period (the end time minus the start time) of each process. The manufacturing processes are assigned sequential process IDs in the order of processes determined previously based on the production planning.

The lot ID is the number assigned uniquely to each production unit of products to be manufactured, for example. Thus, a plurality of products are given the same lot ID, and each of the products having the same lot ID is assigned a unique manufacturing number. The lot is a set of products of the same type corresponding to the production unit, that is, a minimum production unit of products to be manufactured under the same conditions, and one lot contains one or more products. Thus, the visualization system 100 according to Embodiment 1 is applicable not only to the lot but also to a manufacturing unit when the production unit is "one."

The manufacturing results 122 shown in FIG. 2 indicate that a process 1 of products having a lot ID "R001" started at a time "10:50:00" and ended at a time "11:05:00." A subsequent process 2 of the products having the lot ID "R001" started at a time "11:06:00" and ended at a time "11:11:00." Products having a lot ID "R002" are input to the process 1 subsequently to the lot ID "R001." It is shown that the process 1 of the products having the lot ID "R002" started at a time "11:05:05" and ended at a time "11:20:05." It is also shown that the subsequent process 2 of the products having the lot ID "R002" started at a time "11:21:05" and ended at a time "11:26:05."

While the example of the manufacturing results 122 are the results of the plurality of processes extracted for each product manufacturing unit, another example of the manufacturing results 122 can be structured and accumulated according to a predetermined data structure definition. For example, based on a data structure definition (templated data model) formed of "subject (Who)," "object (Whome)," "event (What)," "time (When)," "place (Where)," and "status (How)" (5W1H), fact and result data can be collected and accumulated from data sources.

As shown in FIG. 3, the subject of a data source can be defined as "subject" to organize and accumulate what the "subject" has done to which object ("event"). For example, a Manufacturing Execution System (MES) is used to collect information from a machine 1 corresponding to a data source. The machine 1 operates in manufacturing processes based on a manufacturing plan, and the operation results of the machine 1 are collected in real time by the manufacturing management system. Specifically, what has been performed during the manufacturing processes in the machine 1, and the related state and status of the machine 1 are organized according to the data structure definition, thereby producing the record indicating that a machine 1 (subject) performed assembly (event) on products having certain product numbers (object). The records of the results produced according to the data structure definition are accumulated chronologically in the data model.

A table at the top in FIG. 3 shows an example of manufacturing and operation result data. For "objects" of the manufacturing and operation result data, detailed results of each object are stored in manufacturing recipe result data shown below the top table in FIG. 3. In the manufacturing recipe result data, information collected and accumulated from the machine equipment includes measured values of "object," "time," and "status (manufacturing parameter)." In the manufacturing recipe result data, sensor values detected in real time are also accumulated in "status." The sensor values are sensor information output from sensor equipment provided for the machine 1 sensor information output from sensor equipment provided independently of the machine 1 for detecting the status of the machine 1.

The sensor information includes groups of sensor values detected chronologically at predetermined time intervals.

Data in each group of sensor values is stored in association with each manufacturing processes. The accumulated sensor information includes sensor values output from the machine equipment in the respective manufacturing processes or sensor values necessary for manufacturing or inspection, and includes time-series elements.

It should be noted that the manufacturing results 122 shown in FIG. 2 may be extracted from information accumulated according to the data model described above. Specifically, the "object" corresponds to products, and the "event" or "place" corresponds to each manufacturing process. The "event" includes one or more manufacturing processes. For example, in "place: a third station of a substrate assembly first line of a substrate assembly process," substrate assembly is performed as the "event," and as shown in the manufacturing recipe result data of FIG. 3, the "event" includes a plurality of processes such as CPU mounting and memory mounting. Thus, the information accumulated as shown in FIG. 3 and FIG. 4 includes information similar to the manufacturing results 122 illustrated in FIG. 2, which can clearly show the statuses of the products going through a plurality of processes.

As shown in FIG. 3, the manufacturing and operation result data also includes an inspection process with an inspection machine 1. In manufacturing quality inspection data, information collected and accumulated from the machine equipment is values of the "object," "time," and "status (inspection results)." In addition, acceptance inspection result data of products for use in manufacturing processes is stored. Such an acceptance inspection result can be accumulated as a data model to provide the purchase histories of components of products and the manufacturing histories of the purchased components.

FIG. 4 shows an example of machine management result data which includes a machine alert history and a machine maintenance history. The machine alert history specifies what kind of abnormality occurred in which machine equipment, when the abnormality occurred, and what measures were taken as a result of the abnormality. The machine maintenance history specifies which operator performed what kind of maintenance (such as part replacement or repair) on which machine equipment, when the maintenance was performed, and the history of a part (serial ID) replaced in the maintenance. These are organized according to the data structure definition and accumulated as records of results.

The process characteristic factors 123 shown in FIG. 1 serve as a change history based on a predetermined quality control rule. For example, process characteristic factors called "4M," "5M," "5M1E," and "6M" are factors affecting quality characteristics in the manufacturing processes. Depending on the target for quality control, "4M" represents four factors including Man, Machine, Material, and Method in the field of machining, or Man, Machine, Media, and Management in the analysis of cause and the examination of measures for accidents or disasters. "5M" is used in classification for quality control in factories and represents five factors including Man, Machine, Material, Method, and Measurement. The manufacturing processes may be unstable in some environments, and to address this, quality control is performed with "5M1E" including Environment added to "5M," or with "6M" including Management for controlling the whole process added to "5M." The "4M," "5M," "5M1E," and "6M" come from the initial letters of those factors, and the factors have their attributes (classifications).

For Man (operator), the defective rate may depend on the ability of an operator, and an operator operation history or an operator change history (history of change from a person A to a person B in charge) can be accumulated in logs of process characteristic factor changes. For example, the Man of the process characteristic factor is linked to the acceptance inspection result data shown in FIG. 3. Specifically, the acceptance inspection data stores the record indicating that an acceptance inspection person A (serial ID 5555) purchased motherboards (object) having a component number (D-001) and serial IDs (31235 and subsequent numbers) and corresponding to the object in the manufacturing and operation result data from a company A at 10:00 on Aug. 25, 2016. Based on the operation of the acceptance inspection person A, it can be seen that the components purchased from company A were manufactured in a factory B of the company A.

For Machine (machine and facility), the product quality characteristics may depend on machines, or the quality characteristics may change when maintenance is performed such as replacement or adjustment of machines. A machine change history (maintenance history) can be accumulated. The Machine of the process characteristic factor is linked to the manufacturing and operation result data, manufacturing recipe result data, manufacturing quality inspection data shown in FIG. 3, the data of the machine alert history and the machine maintenance history shown in FIG. 4.

For Material, the product yield may depend on the supplier or brand of materials even when materials of the same type are used. A material change history (history of supplier changes or material changes) can be accumulated. For example, the Material of the process characteristic factor is linked to the procurement result data shown in FIG. 3.

For Method (operation method), the operation efficiency may change when an operation method is modified, or the operation efficiency may change when the procedure of operation methods is modified. An operation method change history (changes in procedure or operation details) can be accumulated. For example, the Method of the process characteristic factor is linked to the manufacturing recipe result data illustrated in FIG. 3, which can clearly show the status of the object being soldered at a flow rate of 44.

For Measurement, measured values may vary or be unstable depending on a measurer, measurement device, or measurement method. A measurement change history (changes in measurer, measurement device, or measurement method, measurement performed or not performed, and measurement results) can be accumulated. For example, the Measurement of the process characteristic factor is linked to the manufacturing quality inspection data illustrated in FIG. 3, which can clearly show the object being inspected, the fact indicating no problem (status) being stored as a result, and what type of check being performed (measurement method) on which object.

For Environment, the manufacturing process (including the inspection process) may be unstable when the temperature, humidity, season, time, vibration, sound, or light changes. An environment change history (changes in environment at each manufacturing process such as sensor output values) can be accumulated. The Environment of the process characteristic factor is linked to the groups of sensor values stored chronologically in association with the respective manufacturing processes.

While the attributes of the factors in "5M1E" are described, change histories of the factors in "4M," "5M," and "6M" can be accumulated similarly in change logs. Media (media and environment) in "4M" is a factor mainly related to a medium between Man and Material, such as work environment, manual, and work information. Management in "6M" means the management of strategies on how to operate a factory in the future, for example in terms of differentiation from other companies or human resource development.

FIG. 5 shows a data example of the process characteristic factors 123. Description is made herein with "5M" used as an example. As shown in FIG. 5, each of the process characteristic factors 123 includes items such as a change point code, changed attribute category (for 5M classification), time of occurrence, recorder information, process ID, lot ID of occurrence, details (description of how the process characteristic factor changes), and sensor measurement values. The process characteristic factors 123 include information which identifies the attribute category of a changed process characteristic factor, the process during which the change of the process characteristic factor occurs, and the lot ID of the lot being processed at the time of the change.

The process characteristic factors 123 can be accumulated from daily operation reports made by operators stored in the recorder information, or the process characteristic factors 123 can be created and accumulated automatically in response to a signal indicating a change in process characteristic factor provided by the manufacturing management system. In addition, histories of operation and input or utterances of operators to their tablet terminals can be collected and accumulated for use. The example of FIG. 5 shows that a change in Man attribute occurred at a process 1, an operator A was replaced with an operator B, and the lot ID at that time was "ZD1-150107."

It is also shown that a change in Measurement attribute occurred at the process 1, the operator B performed a predetermined inspection on the machine equipment, and the lot ID at that time was "ZD1-150107."

It is also shown that a change in Machine attribute occurred at the process 1, the operator B performed predetermined maintenance on the machine equipment, and the lot ID at that time was "ZD1-150107." Three changes occurred in Machine attribute, including a change in temperature setting, a change in arm angle, and a change in arm speed.

It should be noted that various types of information stored in the storage apparatus 120 may be collected and stored directly from data sources without the intervening manufacturing management system. In this case, the control apparatus 110 of the visualization system 100 can have an information processing function of editing and processing the information collected from the data sources into various types of information for use in visualizing the manufacturing statuses of products manufactured through the manufacturing processes in order.

The process characteristic factors 123 may be included in the manufacturing results 122 and collected therefrom. Thus, instead of receiving the independent process characteristic factors 123 from the manufacturing management system, the visualization system 100 can have an information processing function of creating various type of information such as the manufacturing results 122 and the process characteristic factors 123 for use in visualizing the manufacturing statuses based on the information received from the manufacturing management system.

Next, visualization processing according to Embodiment 1 is described. FIG. 6 is an explanatory diagram for a visualization function according to Embodiment 1, including a time chart representing individual manufacturing processes based on manufacturing results (manufacturing status chart in manufacturing units) and a 5M1E timeline chart based on the process characteristic factors.

FIG. 7 is a diagram showing an example of the time chart representing individual manufacturing processes based on the manufacturing results, and is exemplary display of visualized manufacturing statuses of products manufactured through a plurality of manufacturing processes in order. The horizontal axis represents time and the vertical axis represents individual manufacturing processes arranged in time sequence. Time axes T1 to T6 are provided for the respective manufacturing processes such that the time axes T1, T2, T3, T4, T5, and T6 are arranged in parallel from the top. The time axis T1 is provided for indicating a start time of Process 1, and display objects shown by "O" represent individual products. The time axis T2 is provided for indicating a start time of Process 2. For convenient of description, an end time of Process 1 coincides with the start time of Process 2, but the end time of Process 1 may be shifted from the start time of Process 2. This applies to the time axes T3 to T5. The time axis T6 is a time axis on which an end time of Process 5 is plotted.

The control apparatus 110 according to Embodiment 1 includes a creation section 112. The creation section 112 acquires the start time of each manufacturing process for each lot ID from the manufacturing results 122. The first creation section 112 creates, for each product manufacturing unit (lot), a line segment connecting the start time of Process 1 on the time axis T1 of Process 1 to the start time of Process 2 subsequent to Process 1 on the time axis T2 in parallel with the time axis T1 of Process 1. Specifically, the creation section 112 plots marks indicating the start times on the time axes T1 and T2 of the manufacturing processes and then creates the line segment connecting the marks plotted on the time axes T1 and T2 between the processes (connecting the start times between Processes 1 and 2). Similarly, the creation section 112 creates a line segment connecting the start time of Process 2 on the time axis T2 of Process 2 to the start time of Process 3 subsequent to Process 2 on the time axis T3 of Process in parallel with the time axis T2 of Process 2. The similar creation of marks and a line segment indicating start times is performed on the time axes T4 and T5 of Process 4 subsequent to Process 3 and Process 5 subsequent to Process 4.

As described above, the creation section 112 creates the line segments sequentially connecting the start times on the time axes of adjacent two of the manufacturing processes arranged in time sequence for each manufacturing unit (product or lot) in the manufacturing line to provide the time chart representing individual manufacturing processes. These time axes T1 to T6 are aligned to have the same time points along the vertical direction.

The 5M1E timeline chart is now described. For example, one of the manufacturing processes in the time chart representing individual manufacturing processes can be selected, and a 5M1E timeline chart can be created and displayed from the selected one manufacturing process. In addition to the selection of the manufacturing process, a time range on the timeline can be selected.

As shown in the chart of FIG. 6, the horizontal axis represents time and the vertical axis represents process characteristic factors. FIG. 6 shows an example of display in Gantt chart form. As described above, the process characteristic factors 123 include change logs accumulated chronologically, so that the change logs of the Machine attribute can be displayed on the timeline. When a change log representing "non-operational" is present within a predetermined time range, the zone including the change log representing "non-operational" can be displayed on the timeline. By way of example, an operational timeline object representing "operational" within the predetermined time range can be displayed chronologically adjacent to a non-operational timeline object representing "non-operational" to distinguish between the "non-operational" zone and other zones ("operational" zones).

This processing is also performed for the process characteristic factors "Man," "Material," and "Method." Based on the change logs of the Man attribute (for example, operator replacement), the time range in which Mr. Sato operated or was in charge and the time range in which Mr. Tanaka, who replaced Mr. Sato, operated or was in charge can be displayed on the timeline. For Material, lot IDs of materials used for products manufactured in individual time zones can be represented chronologically on the timeline.

Method is related to processing conditions used in the processes, and objects are represented on the timeline to indicate a switch from values detected by a sensor a to values detected by a sensor ß, for example. Measurement is related to change points in terms of accuracy of measurement equipment, measurement conditions, and measurement method. The application can be extended to include inspections or inspection results. For example, objects representing inspection results ("O" for OK, or "X" for not OK) can be plotted and displayed on the timeline. For Environment, changes in sensor value over time can be represented with a line graph.

In display of the 5M1E timeline chart, the process characteristic factors along the vertical axis can be selected on a graph display selection screen shown in FIG. 8. As described above, the process characteristic factors for 5M1E include Machine, Man, Material, Method, Measurement, and Environment, and each of the process characteristic factors can include one or more items.

For example, the process characteristic factor "Machine" can include items such as machine operation state, machine event, manufacturing works (products, assembled/used member), processing conditions (recipe), measurement and inspection results, tool and mold, and machine maintenance. The process characteristic factor "Man" can include items such as a worker name, voice, action, and state. The process characteristic factor "Environment" can include items such as a temperature, humidity, concentration, outside air temperature, outside air humidity, supplied air temperature, supplied air humidity, and vibration.

As shown in FIG. 6, in Embodiment 1, the changes in the process characteristic factors consisting of 5M1E can be represented on the respective different timelines. In addition, for more visible display, the process characteristic factors including 5M1E can be defined as broad categories, and items to be displayed in each of the process characteristic factors can be defined as middle categories. The process characteristic factor "Man" includes Man attribute items such as a worker name, voice, action, and state. The process characteristic factor "Environment" includes Environment attribute items such as a temperature, humidity, concentration, outside air temperature, outside air humidity, supplied air temperature, supplied air humidity, and vibration.

The process characteristic factor "Machine" includes "Machine" attribute items such as "machine operation state," "machine event," and "machine maintenance." In addition, items belonging to different process characteristic factors can be selected for "Machine", such as "assembled and used member" belonging to Material, "measurement and inspection results (quality inspection)" belonging to Measurement, "processing conditions (recipe), tool and mold" belonging to Method, since those process characteristic factors are related to products.

For example, in addition to the items including the operation state and maintenance history displayed in "Machine," some items of the other process characteristic factors selected from "Machine" viewpoint can also be displayed in "Machine." Thus, from the viewpoint of one process characteristic factor, the statuses (changes) of the other process characteristic factor can also be seen on the timeline. On the timeline of the process characteristic factor category "Machine," the items can be displayed, such as "assembled and used member" belonging to the process characteristic factor "Material," "measurement and inspection results (quality inspection)" belonging to the process characteristic factor "Measurement," and "processing conditions (recipe), tool and mold" belonging to the process characteristic factor "Method."

For display of the 5M1E timeline chart, items to be displayed can be selected from the viewpoint of each process characteristic factor category on the graph display selection screen shown in FIG. 8 before or during display operation. Any item can be added to preset items, or any item can be deleted (not displayed), and the operation for adding or deleting any item can be performed on the graph display selection screen shown in FIG. 8.

In Embodiment 1, the states and changes in the process characteristic factors are accumulated as chronological history information. Each of the process characteristic factors includes one or more items belonging thereto. The chronological history information is configured to be accumulated for each of the items. A display control section 111 creates and displays the graph display selection screen on the display apparatus 300. Based on the chronological history information of selected items, the creation section 112 creates display objects associated with each item and representing the states or changes of the item belonging to the process characteristic factor and places the created display objects on the time axis to create timeline objects of the process characteristic factor. The display control section 111 displays a 5M1E timeline chart (process characteristic factor timeline screen) on the display apparatus 300 in which the timeline objects created from the display objects associated with each item placed on the time axis are arranged in parallel.

The 5M1E timeline chart according to Embodiment 1 is now described. The 5M1E timeline chart includes a 5M1E timeline chart created from machine viewpoint shown in FIG. 9 and a 5M1E timeline chart created from product viewpoint shown in FIG. 10.

<5M1E Timeline Chart Created from Machine Viewpoint>

The 5M1E timeline chart created from machine viewpoint is displayed, for example, to compare non-defective articles with defective articles. When non-defective articles and defective articles occur among products (either the same or similar type of products) manufactured with the same machine during the manufacturing process, it is necessary to examine whether the machine or the products have problems. In such a case, the 5M1E timeline chart created from machine viewpoint is used to display information including conditions imposed on the machine in manufacturing the products of interest or manufacturing results (such as sensor information) from the machine.

In the example of FIG. 9, the machine operation status is displayed as a bar graph on the timeline (time axis) such that bar segments are shown in different colors between the operation states "operational" and "non-operational." Specifically, the history of the process characteristic factor includes operational time zones and non-operational time zones, and when a change log representing "non-operational" is present within the time range to be displayed, timeline objects (time axis) are created and displayed such that the "non-operational" segment is shown in an aspect different from the "operational" segment.

The item "machine maintenance" (displayed as "maintenance") includes display marks on the timeline, and each mark represents a time period or time zone during which maintenance was performed. The item "manufacturing works" (displayed as "product") includes marks representing products input to the machine on the timeline and plotted on the time axis. In other words, the products processed in the machine are plotted. The plotted products can be shown to allow distinction between non-defective articles and defective articles. The attributes of the non-defective articles and defective articles can be acquired from the inspection results of the individual products. When the item "manufacturing works" is selected on the screen of FIG. 8 as a display item of the 5M1E timeline chart created from machine viewpoint, the attribute information of products (lot ID, start time, non-defective/defective article) is acquired from the manufacturing results 122 and plotted on the timeline.

<From Product Viewpoint>

The 5M1E timeline chart created from product viewpoint represents time-series changes in process characteristic factors on the timeline from the viewpoint of one unit of products of interest. For example, when the state of the machine is checked in the 5M1E timeline chart created from machine viewpoint, and it is determined that the machine has no problem, then the 5M1E timeline chart created from product viewpoint can be displayed to see detailed information about the products of interest.

Non-defective articles may be compared with defective articles. In this case, their 5M1E timeline charts created from product viewpoint can be displayed together or switched. For example, in response to selection of a defective product in the item "manufacturing works" (displayed as "product") of the 5M1E timeline chart created from machine viewpoint, a 5M1E timeline chart is created and displayed from product viewpoint for the selected defective product. While description is made of the switching from the 5M1E timeline chart created from machine viewpoint to the 5M1E timeline chart created from product viewpoint, one unit of products of interest may be specified to immediately display the 5M1E timeline chart created from product viewpoint without displaying the 5M1E timeline chart created from machine viewpoint.

FIG. 10 shows an example of one unit of products going through a plurality of manufacturing processes. Thus, the timeline of the item "process" shows the processes on the timeline at their processing times (result values). The name or processing details of each process may also be displayed. For the item "Machine," the machine operation state, the machine event, and the maintenance history are displayed on the timeline created from the viewpoint of the products of interest. The items of material and measurement are displayed similarly. It can be said that the 5M1E timeline chart shown from product viewpoint is an edited version of 5M1E timeline charts created from machine viewpoint for representing machines used in manufacturing processes such that those charts are assembled from the viewpoint of one unit of products.

Next, how to use the 5M1E timeline chart is described in detail. For example, an operation before display of a 5M1E timeline chart created from machine viewpoint is performed by selecting a process of a product determined as defective in a predetermined time period on the manufacturing process status display screen shown in FIG. 7. For example, 8 hours may be set by default to create and display the 5M1E timeline chart corresponding to that time range.

In response to selection of the 5M1E timeline chart created from machine viewpoint, a popup screen for "graph display selection" is displayed. A user selects items of process characteristic factors to be displayed. Alternatively, the items may be preset, and in this case, the graph display selection can be skipped. In response to the selection by the user in FIG. 7, machine information acquired in the predetermined time period corresponding to the display range is extracted from the information about the selected product and machine (process) in the manufacturing results 122 and the process characteristic factor 123. The information of the display items selected previously or in real time on the graph display selection screen is extracted from the manufacturing results 122 and the process characteristic factor 123.

FIG. 9 shows an example of the displayed 5M1E timeline chart created from machine viewpoint when the item "manufacturing works" of the process characteristic factor "Machine" is selected and displayed in addition to default items including "machine operation state" and "machine event." On the screen display, "operation state" is displayed as "operation," "machine event" as "event," and "manufacturing works" as "product." The process characteristic factor "Man" shows the information of items "voice" and "action." The display range includes information about the machine for two hours around the start time (00:02). It should be noted that the information initially extracted from the manufacturing results 122 and the process characteristic factor 123 is information of the default items, and when a change is made in display item through user operation, the information of a selected item is acquired and displayed at that time.

For example, in the 5M1E timeline chart created from machine viewpoint shown in FIG. 9, in response to selection of a display object of one of products plotted on the timeline of "product" (with the item name "manufacturing works") at a particular time, the chart is switched to the 5M1E timeline chart created from product viewpoint as shown in FIG. 10.

FIG. 11 is a diagram for explaining the function of showing "what occurs in a particular time period" more visibly on the 5M1E timeline chart created from machine viewpoint by specifically indicating the particular time period rather than presenting the whole chart. A possible approach is to specify a predetermined segment on the timeline and partition the timeline with vertical lines (auxiliary lines) H delimiting the specified segment or to convert the specified segment into an enlarged popup screen which is separately displayed.

In the 5M1E timeline chart created from product viewpoint shown in FIG. 10, preset default items are displayed, similarly to the 5M1E timeline chart created from machine viewpoint shown in FIG. 9. Although not shown in FIG. 9, the default items include "processing conditions (recipe)," "measurement results," "test results (pass/fail)," and "machine event." For a displayed time range (time width), similarly to the 5M1E timeline chart created from machine viewpoint, a preset time period can be displayed, or when a product is specified in the 5M1E timeline chart created from machine viewpoint, O hours around the time of the specified product can be set, for example. The display items of the 5M1E timeline chart created from product viewpoint can be selected on the graph display selection screen in FIG. 8, similarly to the 5M1E timeline chart created from machine viewpoint.

As described above, in Embodiment 1, the process characteristic factors 5M1E can be shown on the same time axis to provide intuitive understanding of the relationship between the time-series processes and the changes in process characteristic factors. Since the changes in process characteristic factors can be represented on the time axis synchronized with the timeline of the manufacturing status, the user can intuitively know what occurs (or nothing occurs).

Defects occur due to various causes during manufacturing processes, and those causes are typically determined from the machine state (5M1E timeline chart created from machine viewpoint). According to Embodiment 1, the 5M1E timeline charts created from the two viewpoints can be displayed to show the product manufacturing history. Thus, the subjective viewpoint can be used in combination with the comprehensive viewpoint to increase the accuracy in determining the causes of defective articles.

In the visualization system according to Embodiment 1, the manufacturing log information including the start time or the end time of each process for each manufacturing unit of the products manufactured through the manufacturing processes in order is stored as the manufacturing results 122 in the storage apparatus 120. In addition, the chronological history information of the process characteristic factors (time-series states including the logs of process characteristic factor changes) including the Machine, Man, Material, and Method in the manufacturing processes is stored as the process characteristic factors 123 in the store apparatus 120.

The control apparatus 110 includes the display control section 111 and the creation section 112. The creation section 112 can include a first creation section and a second creation section. The second creation section creates the display objects in the time chart representing individual manufacturing processes described above (manufacturing timeline screen).

The first creation section creates the time axis for the process characteristic factors synchronized with the time course of the manufacturing log information. In addition, the first creation section can create the display objects showing the states or changes of process characteristic factors based on the chronological history information and arrange the created display objects on the time axis to create the timeline objects of the process characteristic factors. The display control section 111 displays the 5M1E timeline chart (process characteristic factor timeline screen) on the display apparatus 300 in which the timeline objects of the process characteristic factors are arranged in parallel.

The 5M1E timeline chart can be displayed in the two aspects of the machine (process) viewpoint and the product viewpoint. For example, in the time chart representing individual manufacturing processes (manufacturing timeline screen) shown in FIG. 7, the display control section 111 performs control to allow selection of any of the manufacturing processes. The first creation section creates the timeline objects of the process characteristic factors synchronized with the time course of the selected manufacturing process on the manufacturing timeline screen. The display control section 111 can perform control to display the process characteristic factor timeline screen created from process viewpoint (5M1E timeline chart created from machine viewpoint) in response to the selection of the manufacturing process on the manufacturing timeline screen.

In the time chart representing individual manufacturing processes (manufacturing timeline screen) shown in FIG. 7, the display control section 111 performs control to allow selection of any of the products. The first creation section creates the timeline objects of the process characteristic factors synchronized with the time course of the manufacturing processes through which the product selected on the manufacturing timeline screen passed. The display control section 111 can perform control to display the process characteristic factor timeline screen created from product viewpoint (5M1E timeline chart created from product viewpoint) in response to the selection of the product on the manufacturing timeline screen.

The 5M1E timeline chart created from machine (process) viewpoint and the 5M1E timeline chart created from product viewpoint can be switched in cooperation. By way of example, the display control section 111 performs control to allow selection of any of the manufacturing processes in the time chart representing individual manufacturing processes (manufacturing timeline screen) shown in FIG. 7 and displays the process characteristic factor timeline screen (FIG. 9) created from machine viewpoint based on the selected process. The display control section 111 also performs control to allow selection of any of the products on the process characteristic factor timeline screen created from machine viewpoint and displays the process characteristic factor timeline screen (FIG. 10) created from product viewpoint in response to the selection of the product on the process characteristic factor timeline screen created from machine viewpoint.

Use Example a) First, basic conditions are input. For example, based on when and where products of interest were manufactured, the user can specify a time period, products, a place corresponding to a starting point (line, process, or machine) on a predetermined screen (not shown). Result data satisfying those basic conditions is extracted to display a manufacturing process status screen (time chart representing individual manufacturing processes based on manufacturing results) as shown in FIG. 7.

For example, when the specified conditions include a time period and a particular product, display control can be performed to display only the line segments of the particular product and not to display the line segments of the other products in the example of FIG. 7. When the specified conditions include a time period and a starting place (line, process, or machine), all the manufacturing operations performed in the starting place during the specified time period satisfy the conditions, and display control is performed to display the line segments of products being processed during the specified time period as illustrated in FIG. 7.

b) Next, in response to selection of a particular process on the manufacturing process status screen of FIG. 7, a selection screen is displayed to allow selection of display from machine viewpoint or product viewpoint. In response to selection of the machine viewpoint, the screen shown in FIG. 9 is displayed and default items are initially displayed. In response to selection of the product viewpoint, the screen shown in FIG. 10 is displayed and default items are initially displayed. While the machine viewpoint or the product viewpoint can be selected in this case, either the machine viewpoint or the product viewpoint may be automatically displayed by default, for example after the input of the basic conditions at step a).

c) As described above, the screens shown in FIG. 9 and FIG. 10 can be controlled to switch to the graph display selection screen shown in FIG. 8. On the graph display selection screen of FIG. 8, in response to selection of an additional item to be displayed on the screen shown in FIG. 9 or FIG. 10, the control apparatus 110 extracts the result data associated with the selected item and additionally displays the item and the result data. It should be noted that any of the items may be deleted, and in this case, the 5M1E timeline chart from machine (process) viewpoint or the 5M1E timeline chart from product viewpoint is updated to include items except the selected deleted item.

d) The screen switching can be performed not only from the manufacturing process status screen displayed based on the basic conditions described above but also between the screens created from the machine viewpoint and product viewpoint in response to operation on the 5M1E timeline chart created from machine viewpoint shown in FIG. 9 and the 5M1E timeline chart crated from product viewpoint shown in FIG. 10. In response to selection of one of products on the screen of FIG. 9, the result data about the selected product is extracted to display the screen created from the product viewpoint shown in FIG. 10. In response to selection of one of processes on the screen of FIG. 10, the result data about the selected process is extracted to display the screen created from the machine viewpoint shown in FIG. 9.

Embodiment 1 has been described in conjunction with the display of the timeline charts created from the machine viewpoint and product viewpoint, and the switching between the machine viewpoint and the product viewpoint. Next, description is made of display focused on manufacturing works from the machine viewpoint with reference to FIG. 12 and FIG. 12A.

FIG. 12 is a diagram showing an example of manufacturing status display according to Embodiment 1. FIG. 12A is a diagram showing details of the example of manufacturing status display according to Embodiment 1.

The timeline chart displayed from the machine viewpoint shown in FIG. 9 described above is useful in comparing non-defective articles with defective articles. However, when a manufacturing work takes a relatively long time, a series of points (plot) displayed in FIG. 9 does not provide the individual work periods of the products and thus presents a problem of difficulty in specifically indicating the relationship between the 5M1E change points and the manufacturing works.

To address this, in response to specification (selection) of one of the points (starting point) plotted on the time axis in the item of manufacturing works (displayed as manufacturing in FIG. 9) on the timeline chart created from machine viewpoint shown in FIG. 9 ((a) in FIG. 12), the creation section 112 of the control apparatus 110 acquires manufacturing result information about the specified product within a predetermined range including the specified time from the manufacturing records 122 of the storage apparatus 120. The creation section 112 then creates time-series data based on the start time and the end time included in the acquired manufacturing results. The display control section 112 displays the time-series data created in the creation section 112 on the display apparatus 300 in the form of a bar ((b) in FIG. 12).

As shown in FIG. 12A, the bar is displayed such that the time-series data ((c) in FIG. 12A) created by the creation section 112 based on the manufacturing start time and end time associated with each lot ID in the manufacturing results is put on the same time axis ((b) in FIG. 12A). When a plurality of lots are sequentially input within a predetermined time period, the displayed color depending on the number of overlapping lots is darker than when only a single lot is input.

Next, description is made of detailed processing of the manufacturing status display.

In a state where the timeline chart created from machine viewpoint shown in FIG. 9 is displayed by the display control section 111, an instruction for referring to detailed information about a particular product is made by selecting an associated point plotted in "manufacturing works (displayed as manufacturing in FIG. 9)" of the process characteristic factor along the displayed axis. In response thereto, the creation section 112 acquires the manufacturing result information including the particular product and time information from the manufacturing results 122 stored in the storage section 120.

FIG. 9 shows the screen displaying the information about the Process 2 of certain products from machine viewpoint. For example, in response to an instruction for referring to a point plotted at 13:00 in the manufacturing works (displayed as manufacturing in FIG. 9) on the screen, the creation section 112 refers to the information about the Process 2 of the product represented by that point in the manufacturing results shown in FIG. 2 and acquires the information collected around the specified time (for a predetermined time period).

Specifically, this means that the manufacturing results of a lot ID "R011" in the process 2 are specified, so that the creation section 112 acquires the start time and the end time of that lot ID as the information stored in the results of the Process 2 and collected for the predetermined time period. Description is made herein with reference to two information items of "R010" and "R011" as part of the information. The display control section 111 sequentially displays the time-series information items created from the information acquired by the creation section 112 on a bar display field in (b) of FIG. 12A. Specifically, the display control section 111 first displays a bar having a length of a time period from the start time (12:58:30) to the end time (13:01:30) of the "R010," and then a bar having a length of a time period from the start time (12:59:00) to the end time (13:02:00) of the "R011" on the same time axis. Since the start time of "R011" is earlier than the end time of "R010," the bars having the lengths of their respective time periods displayed on the same axis overlap each other, and the overlap has a darker color on the display screen.

As described above, the product manufacturing works are displayed with the bars in one region based on the manufacturing result information. When the works in each process are performed with no problem, the product moves smoothly and the bars overlap evenly. However, when the smooth work flow is prevented for any reason, the bars overlap unevenly and the non-smooth work has a darker or lighter color than the remaining works. This allows the user to know the work status intuitively. In addition, the user can see the relationship between the manufacturing work periods of the product shown by the bars and the 5M1E change points.

While Embodiment 1 has been described, the functions providing the visualization system 100 described above can be implemented by a program. A computer program previously provided for implementing each function can be stored on an auxiliary storage apparatus, the program stored on the auxiliary storage apparatus can be read by a control section such as a CPU to a main storage apparatus, and the program read to the main storage apparatus can be executed by the control section to perform the function of each component.

The program may be recorded on a computer readable recording medium and provided for the computer. Examples of the computer readable recording medium include optical disks such as a CD-ROM, phase-change optical disks such as a DVD-ROM, magneto-optical disks such as a Magnet-Optical (MO) disk and Mini Disk (MD), magnetic disks such as a floppy Disk® and removable hard disk, and memory cards such as a compact Flash®, smart media, SD memory card, and memory stick. Hardware apparatuses including an integrated circuit (such as an IC chip) designed and configured specifically for the purpose of the present invention are included in the recording medium.

While the embodiment of the present invention has been described, the embodiment is only illustrative and is not intended to limit the scope of the present invention. The novel embodiment can be implemented in various other forms, and various omissions, substitutions, and modifications can be made thereto without departing from the spirit or scope of the present invention. The embodiment and its variations are encompassed within the spirit or scope of the present invention and within the invention set forth in the claims and the equivalents thereof.

DESCRIPTION OF THE REFERENCE NUMERALS

100 VISUALIZATION SYSTEM
110 CONTROL APPARATUS
111 DISPLAY CONTROL SECTION
112 CREATION SECTION
120 STORAGE APPARATUS
121 MANUFACTURING PLAN
122 MANUFACTURING RECORD
123 PROCESS CHARACTERISTIC FACTOR
300 DISPLAY APPARATUS

The invention claimed is:

1. A visualization system comprising:
a first storage section configured to store manufacturing log information about manufacturing of products grouped in manufacturing units, products of each unit being manufactured through a plurality of manufacturing processes in order, the manufacturing log information including a start time and an end time of each of the manufacturing processes;
a second storage section configured to store chronological history information of process characteristic factors corresponding to factors affecting quality characteristics in the manufacturing processes;
a first creation section configured to create a time axis for the process characteristic factors in synchronization with a time course of the manufacturing log information, create a display object representing a state or a change of each of the process characteristic factors based on the chronological history information, and place the display object on the time axis to create a timeline object of each of the process characteristic factors;
a second creation section configured to create, for each of the product manufacturing units, a line segment connecting a start time or an end time of a first process on a time axis of the first process to a start time or an end time of a second process subsequent to the first process on a time axis of the second process in parallel with the time axis of the first process; and
a display control section configured to display, on a display apparatus, a process characteristic factor timeline screen including timeline objects of the respective process characteristic factors arranged in parallel,
wherein the first creation section is configured to create the timeline objects of the process characteristics factors in synchronization with a time course of a selected one of the manufacturing processes.

2. The visualization system according to claim 1, wherein the display control section is configured to display, on the display apparatus,
a manufacturing timeline screen including the time axes of the respective manufacturing processes and the line segment created by the second creation section and allowing selection of one of the manufacturing processes on the manufacturing timeline screen, and
the process characteristic factor timeline screen is created from process viewpoint in response to the selection of the manufacturing process on the manufacturing timeline screen.

3. The visualization system according to claim 1, wherein the display control section is configured to display, on the display apparatus,
a manufacturing timeline screen including the time axes of the respective manufacturing processes and the line segment created by the second creation section and allowing selection of one of the products on the manufacturing timeline screen,
the first creation section is configured to create the timeline objects of the process characteristics factors synchronized with courses of time for the entire more than one of the manufacturing processes that one of the products selected on the manufacturing timeline screen goes through, and
the display control section is configured to display the process characteristic factor timeline screen created from product viewpoint in response to the selection of the product on the manufacturing timeline screen.

4. The visualization system according to claim 3, wherein the process characteristic factors include one or more items belonging to each of the process characteristic factors,
the chronological history information is accumulated for each of the items, and
the display control section is configured to create an item selection screen for the items and display the created item selection screen on the display apparatus, and in response to selection of at least one of the items and based on the chronological history information of the selected item, create a display object for each item representing a state or a change of the selected item, and place the display object on the time axis to create a timeline object of each of the process characteristic factors.

5. The visualization system according to claim 1, wherein the display control section is configured to display, on the display apparatus,
a manufacturing timeline screen including the time axes of the respective manufacturing processes and the line segment created by the second creation section and allowing selection of one of the manufacturing processes on the manufacturing timeline screen,
the display control section is configured to display the process characteristic factor timeline screen created from process viewpoint in response to the selection of the manufacturing process on the manufacturing timeline screen,
the display control section is configured to allow selection of one of the products on the process characteristic factor timeline screen created from process viewpoint, the first creation section is configured to create, in response to selection of one of the products on the process characteristic factor timeline screen created from process viewpoint, the timeline objects of the process characteristics factors in synchronization with courses of time for the entire more than one of the manufacturing processes that the selected product goes through, and the display control section is configured to display the process characteristic factor timeline screen created from product viewpoint in response to the selection of the product on the process characteristic factor timeline screen created from process viewpoint.

6. The visualization system according to claim 5, wherein the process characteristic factors include one or more items belonging to each of the process characteristic factors, the chronological history information is accumulated for each of the items, and the display control section is configured to create an item selection screen for the items and display the created item selection screen on the display apparatus, and in response to selection of at least one of the items and based on the chronological history information of the selected item, create a display object for each item representing a state or a change of the selected item, and place the display object on the time axis to create a timeline object of each of the process characteristic factors.

7. The visualization system according to claim 5, wherein the display control section is configured to allow specification of a desired time range on the process characteristic factor timeline screen displayed on the display apparatus and display auxiliary lines delimiting the specified time range.

8. The visualization system according to claim 5, wherein the process characteristic factors include at least Machine, Man, Material, and Method in the manufacturing processes.

9. The visualization system according to claim 1, wherein the display control section is configured to display, on the display apparatus, a manufacturing timeline screen including the time axes of the respective manufacturing processes and the line segment created by the second creation section and allowing selection of one of the products on the manufacturing timeline screen, the first creation section is configured to create the timeline objects of the process characteristics factors in synchronization with courses of time for the entire more than one of the manufacturing processes that one of the products selected on the manufacturing timeline screen goes through, the display control section is configured to display the process characteristic factor timeline screen created from product viewpoint in response to the selection of the product on the manufacturing timeline screen, the display control section is configured to allow selection of one of the manufacturing processes on the process characteristic factor timeline screen created from product viewpoint, the first creation section is configured to create, in response to selection of one of the manufacturing processes on the process characteristic factor timeline screen created from product viewpoint, the timeline objects of the process characteristics factors in synchronization with a time course of the selected manufacturing process, and the display control section is configured to display the process characteristic factor timeline screen created from process viewpoint in response to the selection of the manufacturing process on the manufacturing timeline screen.

10. The visualization system according to claim 9, wherein the process characteristic factors include one or more items belonging to each of the process characteristic factors, the chronological history information is accumulated for each of the items, and the display control section is configured to create an item selection screen for the items and display the created item selection screen on the display apparatus, and in response to selection of at least one of the items and based on the chronological history information of the selected item, create a display object for each item representing a state or a change of the selected item, and place the display object on the time axis to create a timeline object of each of the process characteristic factors.

11. The visualization system according to claim 9, wherein the display control section is configured to allow specification of a desired time range on the process characteristic factor timeline screen displayed on the display apparatus and display auxiliary lines delimiting the specified time range.

12. The visualization system according to claim 9, wherein the process characteristic factors include at least Machine, Man, Material, and Method in the manufacturing processes.

13. The visualization system according to claim 1, wherein the process characteristic factors include one or more items belonging to each of the process characteristic factors, the chronological history information is accumulated for each of the items, and the display control section is configured to create an item selection screen for the items and display the created item selection screen on the display apparatus, and in response to selection of at least one of the items and based on the chronological history information of the selected item, create a display object for each item representing a state or a change of the selected item, and place the display object on the time axis to create a timeline object of each of the process characteristic factors.

14. The visualization system according to claim 13, wherein the display control section is configured to allow specification of a desired time range on the process characteristic factor timeline screen displayed on the display apparatus and display auxiliary lines delimiting the specified time range.

15. The visualization system according to claim 13, wherein the process characteristic factors include at least Machine, Man, Material, and Method in the manufacturing processes.

16. The visualization system according to claim 1, wherein the display control section is configured to allow specification of a desired time range on the process characteristic factor timeline screen displayed on the display apparatus and display auxiliary lines delimiting the specified time range.

17. The visualization system according to claim 16, wherein the process characteristic factors include at least Machine, Man, Material, and Method in the manufacturing processes.

18. The visualization system according to claim 1, wherein the process characteristic factors include at least Machine, Man, Material, and Method in the manufacturing processes.

19. A visualization apparatus comprising:
- a first storage section configured to store manufacturing log information about manufacturing of products grouped in manufacturing units, products of each unit being manufactured through a plurality of manufacturing processes in order, the manufacturing log information including a start time and an end time of each of the manufacturing processes;
- a second storage section configured to store chronological history information of process characteristic factors corresponding to factors affecting quality characteristics in the manufacturing processes;
- a first creation section configured to create a time axis for the process characteristic factors in synchronization with a time course of the manufacturing log information, create a display object representing a state or a change of each of the process characteristic factors based on the chronological history information, and place the display object on the time axis to create a timeline object of each of the process characteristic factors;
- a second creation section configured to create, for each of the product manufacturing units, a line segment connecting a start time or an end time of a first process on a time axis of the first process to a start time or an end time of a second process subsequent to the first process on a time axis of the second process in parallel with the time axis of the first process; and
- a display control section configured to display, on a display apparatus, a process characteristic factor timeline screen including timeline objects of the respective process characteristic factors arranged in parallel,
- wherein the first creation section is configured to create the timeline objects of the process characteristics factors in synchronization with a time course of a selected one of the manufacturing processes.

20. A program for displaying a change in at least one of process characteristic factors caused in a manufacturing line of products, each of the products being manufactured through a plurality of manufacturing processes in order, the program comprising instructions which, when executed by a computer, cause the computer to perform:
- a first function of storing manufacturing log information including a start time and an end time of each of the manufacturing processes for each product manufacturing unit;
- a second function of storing chronological history information of the process characteristic factors corresponding to factors affecting quality characteristics in the manufacturing processes;
- a third function of creating a time axis for the process characteristic factors in synchronization with a time course of the manufacturing log information, create a display object representing a state or a change of each of the process characteristic factors based on the chronological history information, and place the display object on the time axis to create a timeline object of each of the process characteristic factors; and
- a fourth function of creating, for each of the product manufacturing units, a line segment connecting a start time or an end time of a first process on a time axis of the first process to a start time or an end time of a second process subsequent to the first process on a time axis of the second process in parallel with the time axis of the first process; and
- a fifth function of displaying, on a display apparatus, a process characteristic factor timeline screen including the timeline objects of the respective process characteristic factors arranged in parallel,
- wherein the third function creates the timeline objects of the process characteristics factors in synchronization with a time course of a selected one of the manufacturing processes.

\* \* \* \* \*